Armin Miller
Inventor

By Harvey C. Hornhurst
Atty

United States Patent Office 3,108,261 Patented Oct. 22, 1963

3,108,261

RECORDING AND/OR REPRODUCING SYSTEM

Armin Miller, Menlo Park, Calif., assignor to Ampex Corporation, Redwood City, Calif., a corporation of California Filed Apr. 11, 1960, Ser. No. 21,423
5 Claims. (Cl. 340—174.1)

Figure 1:
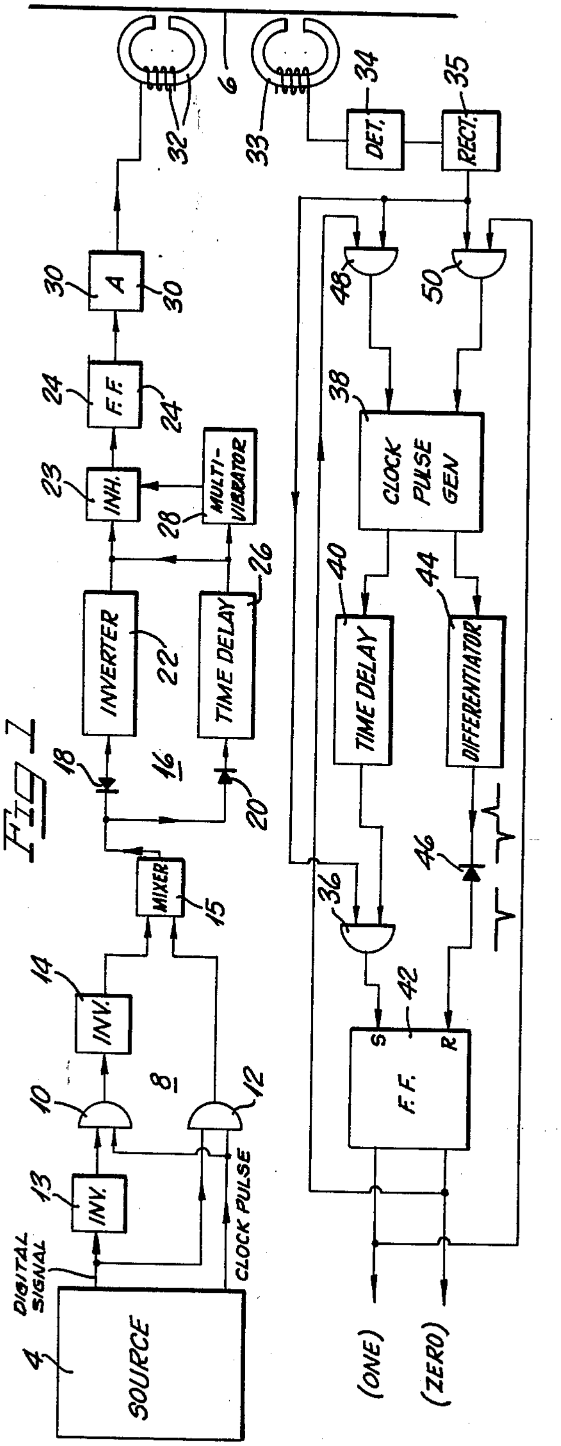

The present invention relates to a recording and/or reproducing system and more particularly to an improved recording and/or reproducing system for digital information.

Generally, coded information in such devices as digital computers is in the form of an electrical signal which periodically represents either one of two digits. The digits are commonly referred to as the digit "one" and the digit "zero." Clock pulses are also provided in the digital device to periodically determine when, for example, the signal contains significant information.

Normally, digital devices are provided with at least one storage device which stores a relatively large volume of digital information without modifying the information. Magnetic mediums such as magnetic tapes, drums, etc. are commonly employed in storage devices.

Digital information is recorded on the magnetic medium as either of two magnetic flux patterns which sequentially occur at discrete points along its length. Normally, at least one of the flux patterns includes a magnetic flux change which may be either a complete reversal of polarity or a change from one level of magnetization to a second level.

Because of, for example, timing variations in recording (writing) and reproducing (reading) the digital information on the magnetic medium, flutter, etc. a clock pulse is normally employed to read data from the magnetic medium. The clock pulse is recorded on a separate channel of the magnetic medium or a continuous clock pulse generator is synchronized by the flux changes in the recorded digital information (self clocking). In this way the clock pulse has the same timing variations as the recorded digital information.

In most present day high capacity storage devices, a plurality of digits (bits) of information making up a given number or character are simultaneously recorded on a relatively wide magnetic medium. This is accomplished by applying separately encoded digital information to each of a plurality of parallel recording heads which are in recording relationship with the magnetic medium. Hence, a plurality of channels or tracks are recorded on the magnetic medium.

In addition, as many digits as can be reliably reproduced are recorded on a unit length of the magnetic medium (high storage density). In this connection, it becomes more difficult to reliably reproduce digits as the digits are recorded closer together because of the electrical and mechanical limitations of the recording and reproducing system.

One limitation on the storage density is that as the storage density is increased the number of flux patterns per length of magnetic medium is correspondingly increased, and hence the number of flux changes per length is increased. A reproducing head has an output which is proportional to the rate of change of the flux in the magnetic medium and, hence, each flux reversal is reproduced as a pulse at the reproducing head. Therefore, as the storage density is increased, the distance between reproduced pulses (wavelength) is decreased. Because of the wavelength resolution of the reproducing system, there is a limit to the number of flux changes per length of magnetic medium that can be reliably reproduced. Accordingly, for a given recording and reproducing system, the density of flux changes is limited. Therefore, for maximum storage density, the minimum possible number of flux changes is employed to represent the digital information.

Another limitation on the storage density is the increased possibility of not reproducing a flux change as the number of flux changes per length of medium is increased (tape dropout error). This is caused, for example, by the wavelength of the reproduced pulses approaching the size of the air gap of the reproducing head as the density of the flux changes is increased. Hence, the chance of an error occurring is decreased as the number of flux changes employed to represent the digital information is decreased.

Still another limitation on the storage density is present when digital information is reproduced in parallel from a magnetic tape. If the tape should skew or twist with respect to the reproducing heads, the head at one side of the magnetic tape may read from one character while the head on the other side may read from a subsequent character. It is difficult to prevent the magnetic tape from skewing, and the error caused by skewing is increased as the distance between flux changes is decreased. However, it is possible to eliminate this error electronically by employing a clock pulse generator with each channel (self clocking), which clock pulse generator is synchronized with the flux changes in the digital information on that channel.

In previously available digital recording systems, the digital information has been recorded on the magnetic medium by employing a return-to-zero method, a non-return-to-zero method (NRZ), or a phase shift method (Manchester method).

In the return-to-zero method of recording digital information, one state of magnetization of the magnetic medium is assigned to the digit "one" and the opposite state of the magnetization of the magnetic medium is assigned to the digit "zero." Ordinarily, the magnetization of the magnetic medium is maintained in one state of magnetization and is pulsed to the opposite state and back again to the original state for the occurrence of the digit "one." Hence, it is necessary to record two flux reversals for each digit "one." As the recorded "one" pulses are packed closer together, adjacent pulses interfere with one another. Hence, it is necessary to leave a space between pulses which is large compared to the duration of the pulse. The reproducing system can only reliably reproduce flux reversals which are further apart than a certain distance. Consequently, the maximum number of digits that can be recorded by this method per unit length of magnetic medium is relatively low.

In the conventional non-return-to-zero method of digital recording no fixed state of magnetization is assigned to either "one" or "zero." Rather, the state of magnetization is reversed from whatever it is each time the digit "one" is recorded and remains unchanged for the recording of the digit "zero." Because only one flux reversal is required for each occurrence of the digit "one" and no flux reversal is required for the digit "zero," the number of digits per length that may be recorded by this recording method should be a maximum. However, major problems arise as the flux reversals are packed closer together.

One of the major problems stems from the limited resolution of the reproducing system. Variations in spacing between flux reversals either causes the reproduced pulses to merge into each other or stretch over the area where there is no reproduced pulse. Another effect stemming from the limited resolution is that the reproduced signal is large when the spacing between flux reversals is wide and small where the spacing is close. Thus, in the NRZ method, because of the limited resolution of the reproducing system, it is difficult to detect the absence or presence of pulses (reversals) as the number of digits per unit length of magnetic medium is increased.

Another limitation on the maximum possible flux reversal density is that since the flux reversals occur at random depending upon the composure of the digital information, the flux reversals are not sufficiently continuous to be employed to synchronize a clock pulse source. Hence, a separate clock pulse channel of the magnetic tape is normally employed, the clock pulse being utilized to read all channels. Since each channel does not have its own clock pulse, such effects as tape skewing place an upper limit on storage density.

In the Manchester method a digit "one" is recorded as a single cycle of a square wave and a digit "zero" is recorded as a single cycle of a square wave shifted 180° from the "one" square wave. A flux reversal in one direction is employed to indicate the digit "one" and a flux reversal in the opposite direction is employed to indicate the digit "zero." This method has the advantage that a flux reversal is provided for each digit whether it is a "zero" or a "one." Hence, the flux reversals may be employed to synchronize a separate clock pulse source associated with each channel whereby the error caused by tape skewing may be electronically eliminated.

While the Manchester method eliminates the problem of tape skewing, it has the disadvantage that, when reading the flux reversals, it is necessary to sense the direction of flux reversal to determine the presence of a "one" or a "zero." Therefore, information drop-out always causes an error in this method. Another disadvantage in this method is that two flux reversals are often necessary to record one digit of digital information. Therefore, since there is a limit on the number of flux reversals that can be reliably reproduced, the maximum possible storage density is limited.

An object of the present invention is the provision of an improved recording and/or reproducing system for digital information. Another object is the provision of a system for recording and/or reproducing a relatively large amount of digital information per unit length of a recording medium. A further object is the provision of a recording and/or reproducing apparatus for digital information which is self clocking by channel.

Other objects and advantages of the present invention will become apparent by reference to the following description and accompanying drawings.

Figure 2:
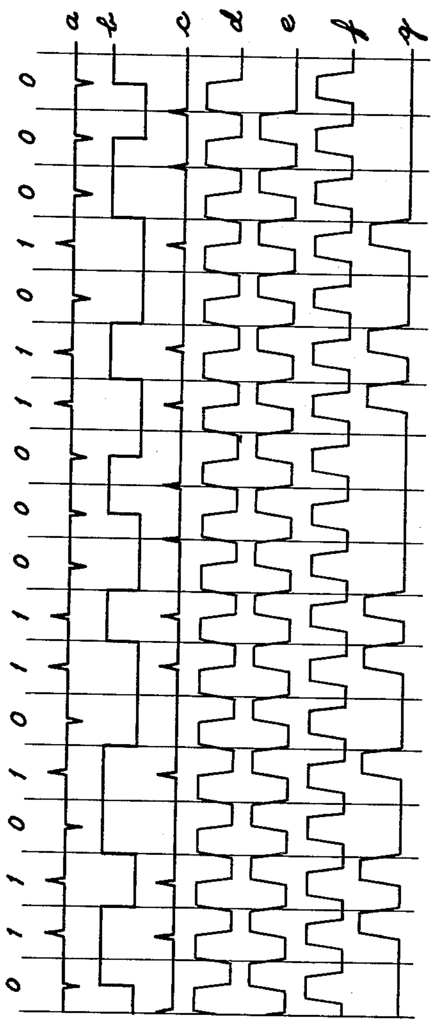

In the drawings:

FIGURE 1 is a block diagram of a digital recording and reproducing system in accordance with the present invention; and FIGURE 2 shows various waveforms in the system shown FIGURE 1.

A system in accordance with the present invention is utilized to record and/or reproduce digital information. The system includes means for supplying a digital signal to be recorded, the signal representing a series of digits which digits occur at sequential time intervals. The digits are either a first digit or a second digit. The digital signal is applied to a recording means which is in recording relationship with a recording medium. A first means, which is coupled to the recording means, provides a reproducible change in the recording medium at approximately the center of each time interval during which the first digit occurs. A second means, which is coupled to the recording means, provides a reproducible change in the recording medium at approximately the boundary of each time interval during which the second digit occurs. When the second digit immediately follows the first digit, means are provided for inhibiting the change produced by the second means.

More specifically, the illustrated system is employed to store digital information which is supplied by a supply or source 4 of digital information, such as a punched tape or other component of a digital computer. The digital information may be translated into various electrical signals, such as for example, a train of pulses which indicates the digits of the digital information at sequential time intervals or periods. A positive pulse indicates a first digit of the digital information, and the absence of a pulse indicates a second digit. For purposes of explanation, the first and the second digits are hereinafter referred to as the "one" digit and the "zero" digit, respectively.

Digital source 4 also provides a train of periodic pulses, which pulses have such a period that one clock pulse ocurs during each time interval. The train of pulses serves as a clock or synchronizing pulse to indicate the presence or absence of a pulse ("one" digit) in the time interval.

In the illustrated system, the digital signal is recorded as flux changes on a magnetic tape 6. The flux change may, for example, be a complete reversal of polarity, or a change from one level of magnetization to a second level. The digit "one" (first digit) is recorded as a flux change at approximately the middle of the time interval, and the digit "zero" (second digit) is recorded as a flux change at the boundary of the time interval. When a digit "zero" follows a digit "one," the flux change normally provided for the digit "zero" is inhibited. Consequently, at most, there is only one flux change for either the digit "one" or the digit "zero," and flux changes are never separated by more than two complete periods.

In the illustrated embodiment, the digital signal and the clock pulse from the digital source 4 are coupled to a coding means 8 wherein each "one" bit is converted into a narrow positive pulse and each "zero" bit is converted into a narrow negative pulse, as shown in FIGURE 2(*a*). As illustrated, the coding means 8 includes a first and a second "and" gates 10 and 12, respectively. An "and" gate is a coincidence device, that is, a signal is yielded at the output of the "and" gate when input signals are simultaneously present at the two inputs of the "and" gate.

The clock pulse and the digital signal are supplied respectively to the inputs of the second "and" gate 12. Thus, a positive signal is yielded at the output of second "and" gate 12 when the clock pulse and digit "one" coincide. The clock pulse is also applied to one of the inputs of the first "and" gate 10 and the digital signal is coupled through a phase inverter 13 to the other input of first "and" gate 10. Hence, a positive pulse is provided at the output of first "and" gate 10 when the "zero" digit and the clock pulse coincide.

The output of first "and" gate 10 is coupled through a phase inverter 14 to one input of a mixer circuit 15. The output of second "and" gate 12 is coupled to a second input of the mixer circuit 15. Mixer circuit 15 combines the positive pulses from "and" gate 12 and the negative pulses from inverter 14 and provides a train of negative and positive pulses at its output. A positive pulse occurs at the output of mixer 15 for each occurrence of digit "one" in the supply means 4, and a negative pulse for each occurrence of digit "zero."

The output from the decoding means 8 (that is, the output of mixer 15) is applied to a common input of a rectifier network 16, such as a pair of oppositely directed diodes 18 and 20. The rectifier network 16 separates the positive pulses from the negative pulses. The output of diode 18, which is connected so as to have a low forward resistance to the negative pulses, is coupled to a conventional phase inverter 22 which inverts the negative pulses. The output of phase inverter 22, in turn, is coupled through an inhibiting gate 23 to a bistable multivibrator 24, such as an Eccles-Jordan type multivibrator. An inhibiting gate yields an output signal for each signal applied to the input thereof except when an inhibiting signal is applied to an inhibiting signal input thereof.

The multivibrator 24 has two stable states or conditions of operation. Multivibrator 24 assumes one state in response to a first positive input pulse and assumes the other state in response to the next positive input pulse. Accordingly, multivibrator 24 is switched from one state to the other for the occurrence of each negative pulse (digit "zero") in the decoding means 8.

The output from the diode 20 which is connected so as to have a low forward resistance to the positive pulses, is coupled to a suitable time-delay circuit 26 which delays the positive pulses approximately one-half of a period. The delayed positive pulse is then applied through the inhibiting gate 23 to the input terminal of multivibrator 24. Consequently multivibrator 24 is switched at the boundary of the period from one state to the other for the occurrence of each positive pulse (digit "one").

The inhibiting gate 23 is actuated by a multivibrator 28 (hereinafter described) so as to prevent pulses from passing therethrough for a total of three-quarters of a period after the occurrence of each delayed positive pulse. When an inverted negative pulse immediately follows a delayed positive pulse, multivibrator 24 is not switched from one state to the other by the inverted negative pulse since the inverted negative pulse occurs approximately one half a period behind the delayed positive pulse. However, when a second delayed positive pulse immediately follows a first delayed positive pulse, multivibrator 24 is switched since the second delayed positive pulse follows the first by a full period.

The multivibrator 28 is a one shot multivibrator which has a momentary stable condition. Multivibrator 28 is designed so that it remains in momentary stable condition for approximately three-quarters of a period after the reception of a positive pulse. The output of the one shot multivibrator 28 is suitably coupled to the inhibiting input of inhibiting gate 23 so as to inhibit the passage therethrough of pulses during the period when the multivibrator is in the momentary stable condition.

As illustrated, the output of the flip-flop multivibrator 24, which output is shown in FIGURE 2(*b*), is coupled through a suitable amplifier or amplifiers 30 to a conventional recording head 32. Recording head 32 is in recording relationship with the magnetic recording tape 6. Tape 6 is moved relative to the recording head 32 by a tape transport means (not shown). Recording head 32 is adapted to magnetize tape 6 to saturation in one direction for one condition of operation of the flip-flop multivibrator 24 and in the other direction for the other condition of operation of multivibrator 24.

It should be understood that while only one recording head and associated circuit are shown, a plurality of recording heads and associated circuits of the type herein described may be employed to record a plurality of channels on tape 6.

A suitable reproducing head 33 is employed to read the digital information recorded on magnetic tape 6 as tape 6 is moved relative to reproducing head 33. Tape 6 is moved by the tape transport means at approximately the same speed as the speed at which the information was recorded. The signal at the output of reproducing head 33 is proportional to the rate of change of flux passing reproducing head 33. Consequently, for each flux reversal, a pulse will be provided at the output of reproducing head 33, a positive pulse indicating a positive flux reversal and a negative pulse indicating a negative flux reversal.

In the illustrated embodiment, the train of negative and positive pulses is applied to a conventional peak detector 34 and a full wave rectifier 35, which provide a signal such as that shown in FIGURE 2*c*. The time base reference, that is, the location of the start of the individual period or time interval relative to the reproduced pulse included therein may be selected at any convenient point. For purposes of explanation, the period is selected so that the reproduced pulses resulting from flux changes recorded to represent the "one" digit in the digital information occur approximately in the center of the period.

The output from full wave rectifier 35 is applied to one input of a two input "and" gate 36 wherein the timing of the reproduced pulses relative to the period is determined. A clock or strobe pulse which approximately corresponds to the center of a period is fed to the other input of "and" gate 36. The clock pulse is provided by a clock pulse generator 38 which, in the illustrated embodiment, is a free running multivibrator. Clock pulse generator 38 has a frequency equal to the nominal frequency at which the information being reproduced was recorded.

Clock pulse generator 38 has a first and a second output. The output voltage (first clock pulse signal) from its first output is high when the output voltage at the second output is low. Conversely, the output voltage (second clock pulse signal) from the second output is high when the output voltage from the first output is low. Clock pulse generator 38 is synchronized as hereinafter explained so that the rise of the high level of the first clock pulse signal occurs approximately at the beginning of each period, and the fall of the high level of the first clock pulse signal occurs approximately at the middle of each period. The first and second clock pulse signals are shown respectively in FIGURES 2(*d*) and 2(*e*).

The first output of clock pulse generator 38 is coupled to a delay circuit 40 wherein the first clock pulse signal is delayed one-quarter of a period. Thus, the high level of the first clock pulse signal is delayed so as to occur approximately in the middle of each period (as shown in FIGURE 2(*f*). The output from the delay circuit 40 is coupled to the second input of "and" gate 36. Hence, when a pulse from the full wave rectifier 35 occurs approximately in the center of a period, that is, at the same time as the high level of the delayed first clock pulse signal, "and" gate 36 yields an output pulse.

In the illustrated embodiment, the output from "and" gate 36 is coupled to flip-flop multivibrator 42. Multivibrator 42 has two inputs, one of which may be designated as the set input and the other as the reset input. Multivibrator 42 assumed one condition (set) of operation for a high level on the set input and the other condition (reset) for a high input on the reset input. Two outputs are associated with multivibrator 42, one of which may be designated digit "one" output, and the other may be designated digit "zero" output. When multivibrator 42 is in the set condition, "one" output is high and "zero" output is low. When the multivibrator is in the reset condition, "zero" output is high and "one" output is low.

As illustrated, the output of "and" gate 36 is coupled to the set input of flip-flop multivibrator 42. Hence, "one" output is high for the occurrence of a pulse at the output of "and" gate 36. Therefore, "one" output is high for each occurence of a reproduce pulse at the middle of a period.

Flip-flop multivibrator 42 is switched to its reset condition of operation at the boundary of the period by a narrow negative pulse which occurs at the boundary of each period. As illustrated, the second output of free running multivibrator 38 is coupled through a differentiator circuit 44 to the reset input of flip-flop multivibrator 42. Differentiator 44 provides a narrow positive pulse and a narrow negative pulse at the rise and fall of the second clock pulse signal of the clock pulse generator 38.

The narrow positive pulse is prevented from reaching the flip-flop multivibrator 42 by a suitable rectifier 46 disposed in the reset input circuit between differentiator 44 and flip-flop multivibrator 42. Consequently, a waveform such as that shown in FIGURE 2(*g*) occurs at the "one" output of flip-flop multivibrator 42, and the inverse waveform occurs at the "zero" output.

Since the clock pulse signal utilized to read the reproduced pulse is not obtained from the tape, variations in the recording and reproducing modes, tape skewing, flutter, etc. cause a variation between the timing of the pulses reproduced from the tape 6 and the timing of the clock pulse signal. Accordingly, it is necessary to continually synchronize the first and second clock pulse signals with the reproduced pulses from tape 6.

In the illustrated embodiment, the clock pulse signals are synchronized by synchronizing clock pulse generator 38. Generator 38 has a first and a second input. The first input is employed to synchronize the rise of the first clock pulse signal and the second input is employed to synchronize the rise of the second clock pulse signal. The first and second inputs are respectively connected to the outputs of a first and a second "and" gate 48 and 50, respectively. The train of pulses from the full wave rectifier 35 is applied to one input of each of the "and" gates 48 and 50. In certain embodiments it may be advantageous to add a delay means just ahead of gates 48 and 50 so that the applied pulses may be delayed until flip-flop 42 is in its proper operating state.

The "one" output of flip-flop multivibrator 42 is connected to the other input of second "and" gate 50, which gate synchronizes the rise of the second clock pulse signal. The "zero" output of multivibrator 42 is connected to the other input of first "and" gate 48, which gate synchronizes the rise of the first clock pulse signal. Consequently, when the "one" output of flip-flop multivibrator 42 is high, which results from each occurrence of a reproduced pulse at the middle of a period, the second "and" gate 50 applies a pulse to the second input of clock pulse generator 38. The rise of the second clock pulse signal is thus synchronized by each occurrence of a pulse at approximately the middle of a period ("one" digit).

When flip-flop multivibrator 42 is operating in the reset state of operation, the "one" output of multivibrator 42 is low and the "zero" output is high. Therefore, each pulse at the boundary of a period ("zero" pulse) produces a pulse at the output of the first "and" circuit 48. Thus, the rise of the first clock pulse signal is synchronized by each occurrence of a pulse at the boundary of a period ("zero" digit). Thus, the proper clock pulse of the clock pulse generator 38 is always synchronized by the pulse from reproducing head 33.

If the pulse at the center of the period ("one" pulse) occurs earlier than normal, the flip-flop multivibrator 42 provides a signal at the "one" output earlier than normal and this, in turn, provides a synchronizing pulse to the clock pulse generator 38 earlier than normal. Thus the rise of the second clock pulse is synchronized at an earlier time than normal.

If the pulse representing the digit "one" occurs later than normal, the synchronizing signal to clock pulse generator 38 arrives later than normal and the rise of the second clock pulse is resynchronized to begin from the arrival time of the synchronizing pulse. Thus, the clock pulse generator is being continually rephased in synchronism with the reproduced pulses.

Preferably, for proper reproducing of the digital information, clock pulse generator 38 is synchronized by some starting pulse (not shown) at the beginning of the read mode. This may be accomplished simultaneously with the "zero" digit at the beginning of the read mode.

As shown in FIGURE 2(*f*), the high level of the first clock pulse signal occupies approximately 25% of the period on either side of the middle of the period. Therefore, since a flux change occurs at least every two periods, the pulse arrival time of the "one" digit pulse at the "and" gate 36 may vary as much as 12½ percent without producing a reading error. Thus, flutter, tape speed variation, etc. in the write-read modes may total to a plus or minus 12½ percent without causing a reading error due to synchronization.

Since in the above described system, digital information is recorded with, at the most, one flux change per period, a maximum storage capacity is obtained by the above described system. Moreover, in the above described system, since a "zero" flux change is not employed except for synchronization, not reading a "zero" flux change does not necessarily cause an error in reproducing the digital information. In addition, the above described system yields flux reversals which may be employed to synchronize the information being read (self clocking) and hence tape skewing does not cause an error. Thus, by employing the above described system a large amount of digital information may be reliably recorded per length of recording medium.

Various changes and modifications may be made in the above described digital recording and/or reproducing system without departing from the spirit or scope of the present invention. Various features of the present invention are set forth in the accompanying claims.

What is claimed is:

1. In a recording and/or reproducing system for digital information, means for supplying a digital signal, said signal having a waveform which represents a series of digits occurring at sequential time intervals, said digits being either a first or a second digit, means coupled to said supplying means for converting said first digit to a positive narrow pulse and said second digit into a negative narrow pulse, means coupled to said converting means for separating the positive pulses from the negative pulses, means coupled to said separating means for inverting each negative pulse, means coupled to said separating means for delaying each positive pulse approximately one-half of the time interval, an inhibiting means coupled to said delay means and said inverting means, a bistable multivibrator coupled to said inhibiting means, said multivibrator being switched from one condition of operation to the other condition of operation by the output signal from said inhibiting means, means coupled to said delay means for providing an inhibiting signal for approximately three-fourths of the time interval after each output signal of said delay means, means for connecting said inhibiting signal providing means to said inhibiting means so as to prevent pulses from passing therethrough during said three-fourths of the time interval, a magnetic tape, and a recording means in recording relationship with said magnetic tape, said recording means being coupled to said multivibrator so that the switching of said multivibrator causes alternate opposite flux changes in said magnetic tape.

2. In a recording and/or reproducing system for digital information, means for supplying a digital signal to be recorded, said signal having a waveform which represents a series of digits occurring at sequential time intervals, said digits being either a first or a second digit, recording means coupled to said supplying means, a recording medium in recording relationship with said recording means, means coupled to said recording means for providing a reproducible change in said recording medium at approximately the center of the time interval for each occurrence of said first digit in said supplying means, further means coupled to said recording means for providing a further reproducible change in said recording medium at approximately the boundary of the time interval for each occurrence of said second digit in said supplying means, means coupled to said recording means for preventing the change provided by said further means when said second digit immediately follows said first digit, means for reproducing the changes in said recording medium, means for providing a clock pulse signal, means coupled to said clock pulse providing means and said reproducing means for synchronizing said clock pulse providing means with said reproduced changes so as to maintain a predetermined timing relationship between the clock pulse and the reproduced changes, and means coupled to said reproducing means and said clock pulse providing means for providing a digital signal conforming to the digital signal recorded.

3. In a recording and/or reproducing system for digital information, means for supplying a digital signal to be recorded, said signal having a waveform which represents a series of digits occurring at sequential time intervals, said digits being either a first digit or a second digit, a recording means coupled to said supplying means, a recording medium in recording relationship with said recording means, means coupled to said recording means for providing a reproducible change in the recording medium at approximately the center of the time interval for each occurrence of said first digit in said supplying means, further means coupled to said recording means for providing a further reproducible change in the recording medium at approximately the boundary of the time interval for each occurrence of said second digit in said supplying means, means coupled to said recording means for preventing the change provided by said further means when said second digit follows said first digit, means for reproducing the changes in said recording medium, means for supplying a clock pulse signal having a wavelength approximately equal to the time interval, means coupled to said clock pulse supplying means and to said reproducing means for synchronizing said clock pulse supplying means with the reproduced changes so as to maintain a predetermined timing relationship between the clock pulse signal and the reproduced changes, and means coupled to said clock pulse supplying means and said reproducing means for converting each reproduced change which occurs at approximately the center of the clock pulse time interval into a waveform which represents said first digit and the reproduced changes which occur at approximately the boundary of the clock pulse time interval into a waveform which represents said second digit.

4. In a recording and/or reproducing system for digital information, a recording medium having thereon a series of reproducible changes occurring during discrete sequential intervals, said changes occurring either at approximately the boundary of the interval or at approximately the center of the interval, said change not occurring at the center of an interval when a change occurs at the boundary of the previous interval, means in reproducing relationship with said recording medium for reproducing the changes, means for providing a clock pulse signal, means coupled to said clock pulse supplying means and the output of said reproducing means for synchronizing said clock pulse supplying means with each reproduced change so as to maintain a predetermined timing relationship between the clock pulse signal and each reproduced change, and means coupled to the outputs of said reproducing means and said clock pulse supplying means for converting each reproduced change which occurs at approximately the boundary of the interval into a waveform representing the occurrence of the boundary change.

5. In a recording and/or reproducing system for digital information, a magnetic recording medium having thereon a series of flux changes occurring during discrete sequential intervals, said flux changes occurring either at approximately the boundary of the interval or at approximately the center of the interval, said change not occurring at the center of an interval when a change occurs at the boundary of the previous interval, means in reproducing relationship with said recording medium for reproducing the flux changes, means for providing a clock pulse signal having a wavelength approximately equal to the length of the interval, means coupled to said clock pulse supplying means and the output of said reproducing means for synchronizing said clock pulse supplying means with each reproduced change so that the clock pulse occurs at the boundary of the interval, and means coupled to the outputs of said reproducing means and said clock pulse supplying means for providing an output signal when the boundary pulse and the clock pulse occur at substantially the same time.

References Cited in the file of this patent

UNITED STATES PATENTS 2,704,361 Pouliart et al. ----------- Mar. 15, 1955
2,807,004 Pouliart et al. ----------- Sept. 17, 1957